US007972005B2

(12) United States Patent
Jose

(10) Patent No.: US 7,972,005 B2
(45) Date of Patent: Jul. 5, 2011

(54) COMPUTER PROJECTOR METHOD AND APPARATUS HAVING A SAFETY FEATURE FOR BLACKING OUT A PORTION OF THE IMAGE BEING PROJECTED ONTO A PERSON

(75) Inventor: Jimmy Jose, Bangalore (IN)

(73) Assignee: Agere Systems Inc., Allentown, PA (US)

( * ) Notice: Subject to any disclaimer, the term of this patent is extended or adjusted under 35 U.S.C. 154(b) by 1128 days.

(21) Appl. No.: 11/695,106

(22) Filed: Apr. 2, 2007

(65) Prior Publication Data

US 2008/0239250 A1    Oct. 2, 2008

(51) Int. Cl.
*G03B 21/26* (2006.01)
*G03B 21/00* (2006.01)

(52) U.S. Cl. ............... 353/28; 353/30; 353/97

(58) Field of Classification Search .......... 353/28, 353/30, 97
See application file for complete search history.

(56) References Cited

U.S. PATENT DOCUMENTS

| 6,616,284 B2 * | 9/2003 | Yaniv et al. ............. 353/79 |
| 7,090,352 B2 * | 8/2006 | Kobori et al. ............ 353/30 |
| 2009/0147224 A1 * | 6/2009 | Kurozuka et al. ........ 353/98 |

* cited by examiner

*Primary Examiner* — Tony Ko
(74) *Attorney, Agent, or Firm* — Mendelsohn, Drucker & Associates, P.C.; Yuri Gruzdkov; Steve Mendelsohn

(57) ABSTRACT

A method includes detecting a person located between a projector and a surface on which a first image is projected by the projector, and automatically blacking out a portion of the first image, so that light from the projector does not fall on the face of the person.

20 Claims, 6 Drawing Sheets

COMPUTER PROJECTOR METHOD AND APPARATUS HAVING A SAFETY FEATURE FOR BLACKING OUT A PORTION OF THE IMAGE BEING PROJECTED ONTO A PERSON

FIELD OF THE INVENTION

The present invention relates to computer projectors.

BACKGROUND

In recent years, the computer projector has become the preferred device for audiovisual presentations. A computer projector is a device that projects a picture created from video information received through a peripheral source (e.g., computer, DVD player, or the like). Computer projectors are also known as Digital Projectors or Multimedia Projectors.

During a presentation using a digital projector, the presenter may move in between the projector and the screen, for example to point to an item on the screen. The light that falls on the presenter, especially on the face, irritates the presenter. The presenter may accidentally look at the projector light source. The strong light from the projector may be at best annoying, and at worst harmful to the eye. This problem may occur, for example, during a presentation in a small room with makeshift arrangements.

Well designed auditoriums with screen and projector are properly arranged so that the above described problem is avoided. The projection screen may be positioned high enough above the floor so that the speaker never enters a line-of-sight between the projector and the screen. The speaker/presenter can use a laser light torch to point to images on the screen. This workaround, however, usually can not work in small rooms with low ceilings, which are often used for presentations to small audiences. There is not enough room to locate the projection screen above the height of the presenter, so there is no way to ensure that the presenter does not enter a line-of-sight between the projector and the screen.

SUMMARY OF THE INVENTION

In some embodiments a method includes detecting a person located between a projector and a surface on which a first image is projected by the projector, and automatically blacking out a portion of the first image, so that light from the projector does not fall on the face of the person.

In some embodiments an apparatus includes: a projector that projects a first image onto a surface, and a detector for detecting a person located between the projector and the surface. The projector includes a processor that automatically causes the projector to black out a portion of the first image, so that light from the projector does not fall on the face of the person.

DETAILED DESCRIPTION

Figure 1:
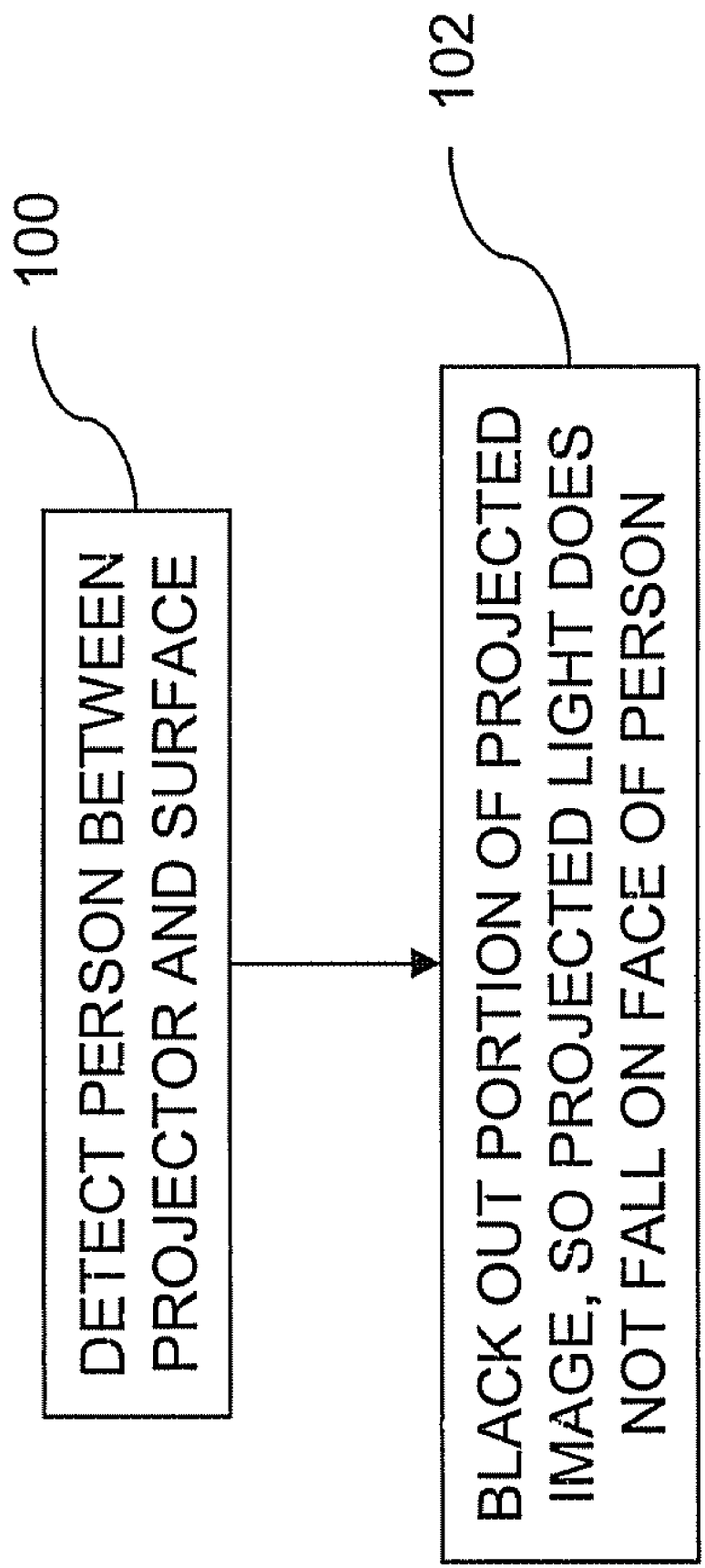
FIG. 1 is a flow chart of an exemplary embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

A method is provided to identify the presence of a person between a digital projector and the screen location. This information is then used to avoid light falling on the presenter by superimposing a black image (region with no light projected) on the projected image. This can protect the eyes of the presenter from being exposed to the strong light of the projector. Because the portion of the display that would otherwise fall on the presenter would not be legible to the audience, elimination of this portion of the display does not remove useful information.

FIG. 1 is a flow chart showing an exemplary method.

At step 100, a person is detected, located between a projector and a surface (e.g., a wall or screen) on which a first image is projected by the projector. The projector may be a digital projector connected to a computer, a DVD player, or other source of digital image or video content. The surface may be a screen, wall or other suitable projection surface.

At step 102, a portion of the first image is automatically blacked out, so that light from the projector does not fall on the face of the person. The blocked out portion of the image may be a region closely contoured to the outline of the person, a region closely contoured to the head of the person, or an oversized simple shape (e.g., a circle or square) that completely contains the head of the person. In a more complex system, the blocked out portion of the image may be a region smaller than the person's head, but large enough to surround the person's eyes, so that the eyes are protected from the bright light of the projector.

Figure 5:
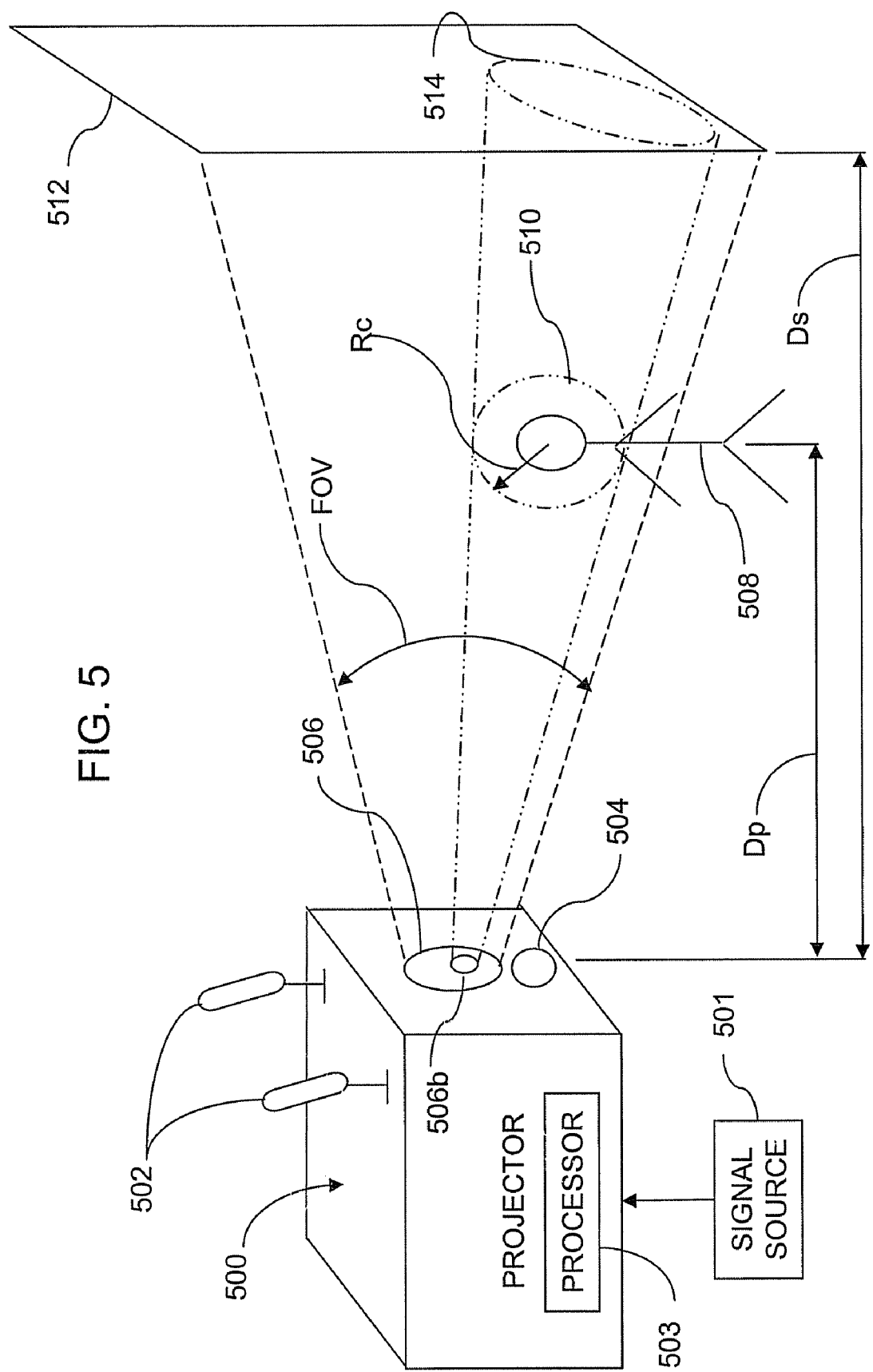
FIG. 5 is a schematic diagram showing an exemplary projection apparatus.

FIG. 5 is a schematic diagram of an exemplary apparatus suitable for use in some exemplary embodiments. The apparatus includes a digital projector 500 connected to a signal source 501, such as a DVD player, or a computer equipped with a presentation program, such as Powerpoint, by Microsoft Corp. of Redmond, Wash. The projector is equipped to project an image onto the projection surface 512, which may be a screen, wall, or the like.

The projector 500 has a plurality of microphones 502, which may be located on the housing of the projector, or may be physically separated from the housing, and connected by a wired or wireless (e.g., Bluetooth) link. The signals from the microphones 502 are provided to a processor 503 in the projector 500, for determining the direction from which the sound of the presenter's voice is coming. Projector 500 also has a sensor 504, such as an infrared (IR) detector, for detecting the distance between the projector and the nearest object (e.g., screen 512 or person 508) in the field of view of the projector.

Herein, the term "field of view" is used herein, both to refer to the angular extent that is seen at any given moment by a sensor 504 or imager co-located with the lens of the projector, and also the extent over which the projector 500 projects light at any given moment (labeled "FOV" in FIG. 5). The latter definition is relevant for the purpose of avoiding light in the presenter's eyes. Thus, when a person 508 enters a line of sight between the projector 500 and the screen 512, this condition is referred to herein as entering the field of view of the projector. In some embodiments, the field of view of the sensor 504 substantially matches the field of view of the projector (angular extent over which light is projected), so that both definitions refer to substantially the same angular extent. In other embodiments, the field of view of the sensor may be less than the field of view of the projector. For example, the vertical field of view of the sensor is not required to extend to the top of the screen, because the presenter typically would not be expected to enter the field of view of the projector near the top of the screen without also entering the field of view at the bottom of the screen.

The processor 503 may be any of a variety of embedded microprocessors or microcontrollers. The processor 503 is configured to receive the sound signals from microphones 502 and determine the direction from which the presenter's voice emanates. The processor is also configured to receive the signals from the sensor 504 and determine the distance to the nearest object (person 508 or projection surface 512). The processor 503 is also configured to automatically, selectively black out a portion 506b of the projected image 506 corresponding to the location of the head of the presenter 508.

Figure 2:
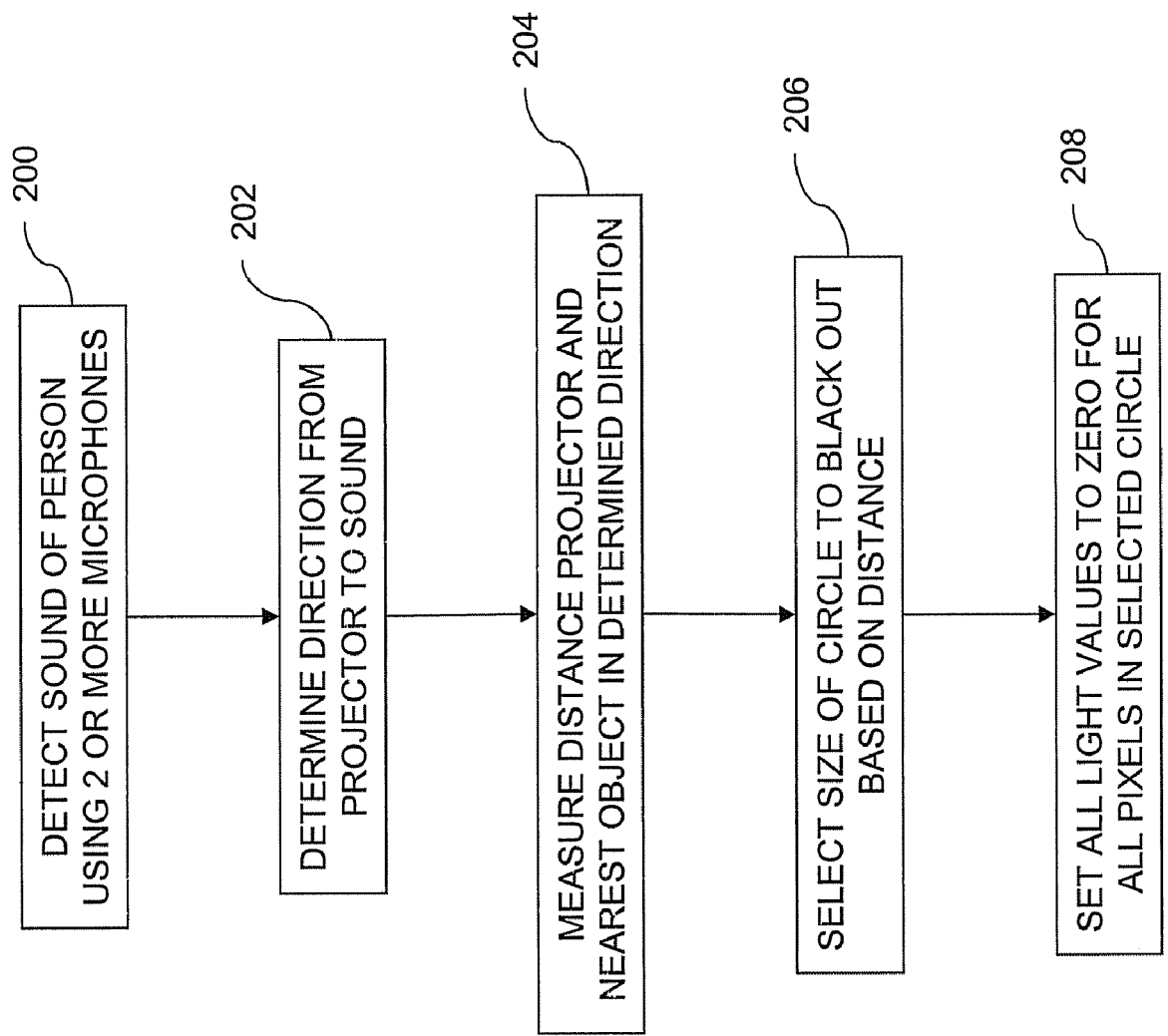
FIG. 2 is a flow chart of an exemplary embodiment.
Figure 4:
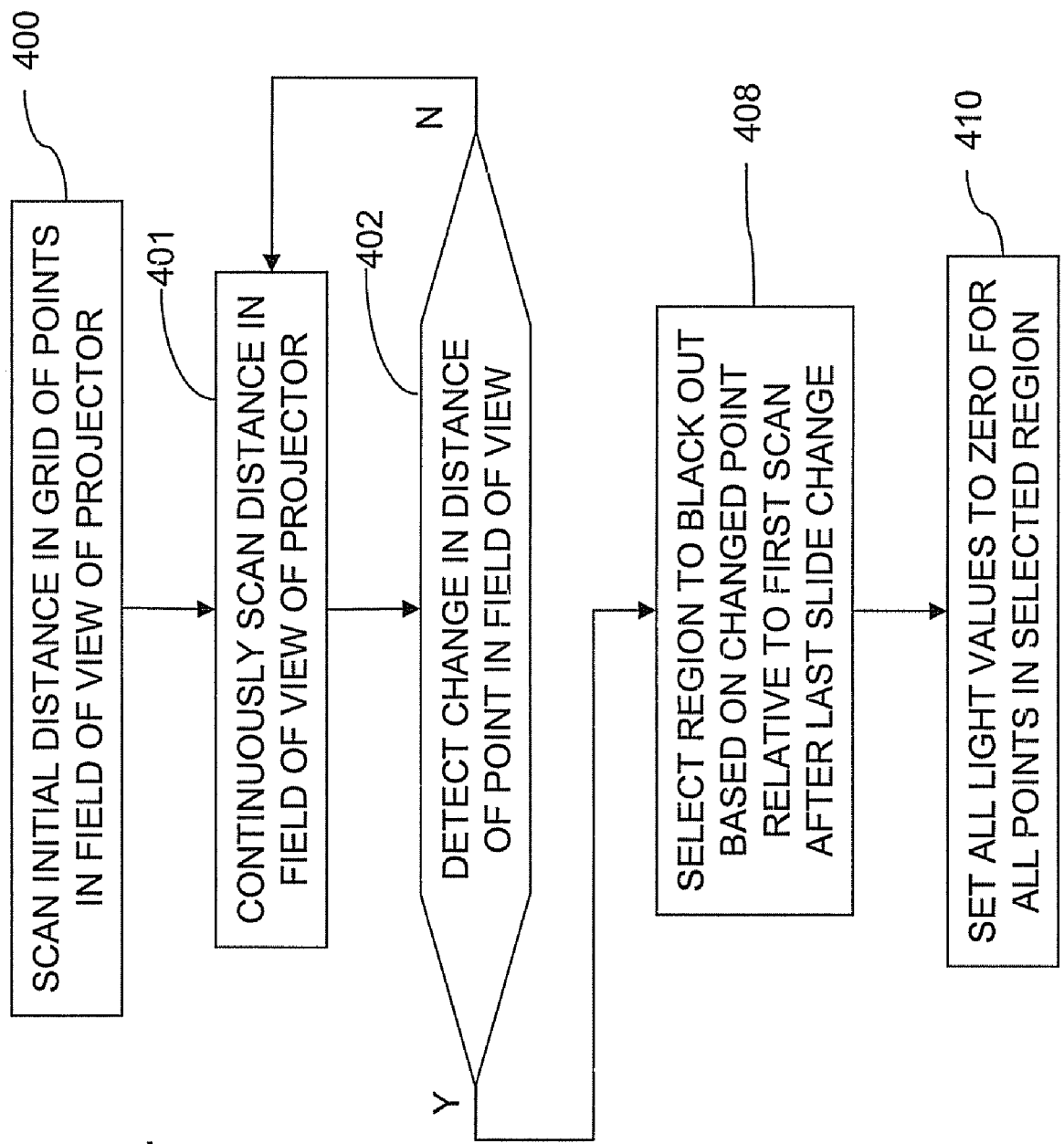
FIG. 4 is a flow chart of an exemplary embodiment.

FIG. 2 is a more detailed flow chart of an exemplary method of operating the apparatus of FIG. 4.

At step 200, the sound of the person 508 (e.g., speech) is detected using two or more microphones 502 co-located with the projector 500. The use of two or more microphones 502 allows the direction vector from the projector 500 to the person 508 to be calculated.

At step 202, the direction vector from the projector 500 to the person 508 is calculated, based on the sounds measured by the two or more microphones 502. Because the direction measurement is based on the presenter's voice, this step more specifically determines the direction from the projector 500 to the presenter's head. As noted above, the apparatus 500 blacks out a portion 506b of the projected image 506 at a location corresponding to the speaker's head, so that the projector light does not shine in the speaker's eyes.

At step 204, the distance between the projector 500 and the nearest object in the determined direction is measured. A variety of devices may be used for measuring the distance, including but not limited to an infrared (IR) sensor or a laser.

In some embodiments, the distance measuring step includes transmitting a beam of infrared radiation in the direction determined at step 202, detecting reflected radiation from the beam, and measuring the time for the round trip travel of the beam or the phase of the returned beam.

Because the detection of the person (or other object) is based on a distance measurement, the detection can be made independently of the image content, and this exemplary method may be used for still slides, animation, or motion video presentations alike.

At step 206, a circle size is selected to be blacked out. In some embodiments, the size of the circle is a function of the distance Dp between the projector 500 and the detected person 508. One of ordinary skill in the art understands that a radius Rc of a projection 510 of the blacked-out circle in the plane of the speaker's face can be selected based on empirical head size statistics, for example. For example, the circle radius Rc, at the plane of the speaker, may be selected so the diameter of the projection 510 of the blacked out circle is a constant that is 20% greater in diameter than the $99^{th}$ percentile head length for the population. A larger size for the projection 510 of the blacked out circle 506b may optionally be selected, if greater assurance is desired that the projector light will not fall on the presenter's face, in the case of inaccuracy in determining the direction of the presenter. Note that the size of the projection 510 may be kept constant, but the size of the blacked out portion 506b at the projector lens depends on the distance between the projector 500 and the presenter 508.

If the distance to the presenter is Dp, and the radius of the projection 510 (of the circle 506b to be blacked out) in the plane of the speaker's face is Rc, then the solid angle occupied by the blacked out portion 510 is given by $(\pi Rc^2)/(4\pi Dp^2) = (Rc/2Dp)^2$. One of ordinary skill can readily program the processor 503 to calculate this solid angle to be blacked out and (based on the optics of any given projector) determine the size of the blacked-out circle 506b in the plane of the projector lens 506 that occupies the same desired solid angle. One of ordinary skill will readily understand that, as the distance between the projector 500 and the presenter 508 becomes greater, the solid angle to be blacked out becomes smaller. The solid angle decreases in proportion to the square of the distance from the projector 500 to the presenter 508.

At step 208, the selected region 506b of the image is blacked out. For example, in a digital display, all pixels within the selected circle 506b have their red, green and blue light values set to the value representing black (e.g., zero). The projection 514 of the blacked-out region 506b on the screen 512 is approximately the same as the region on the screen that would have been blocked by the presenter's head, so the loss of information on the screen 512 is negligible.

Figure 6:
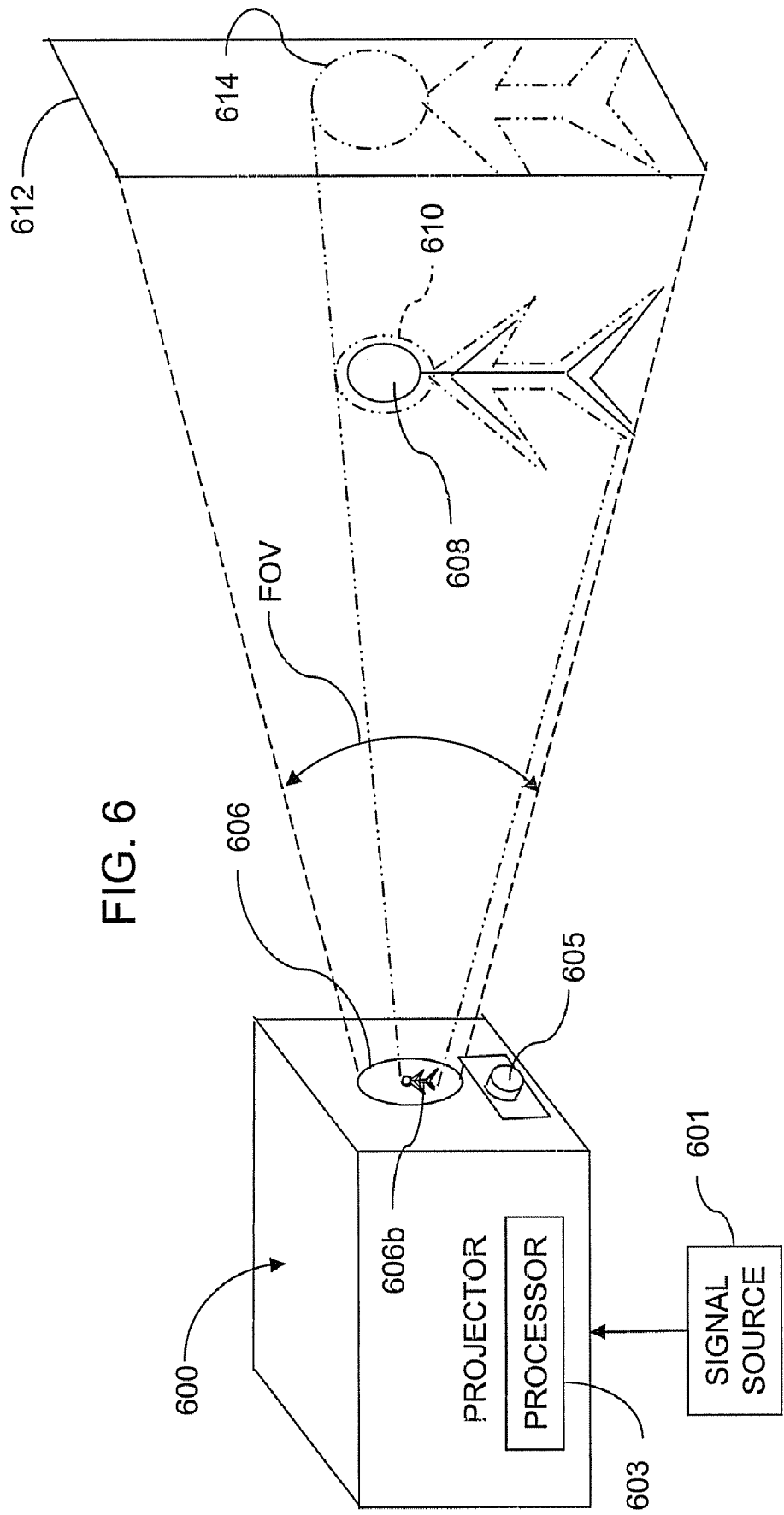
FIG. 6 is a schematic diagram showing another exemplary projection apparatus.

FIG. 6 is a schematic diagram of another exemplary apparatus. The apparatus includes a digital projector 600 connected to a signal source 601, such as a DVD player, or a computer equipped with a presentation program, such as Powerpoint.

The projector 600 has an imager 605, such as a video camera, still camera, or a laser scanner, for continuously imaging the field of view FOV. The imager 605 is preferably co-located with the lens of the projector 600, and may have substantially the same field of view FOV as the projector lens. The signals from the imager 605 are provided to a processor 603 in the projector 600. With reference to FIG. 6, the image projected by the projector 600 on the screen 612 is referred to below as the "first image," and the image captured by the imager 605 is referred to below as the "second image."

The processor 603 may be any of a variety of embedded microprocessors or microcontrollers. The processor 603 is programmed to receive the video signals from imager 605 and determine (1) whether a portion of the image has changed, and (2) which pixels are affected. The processor 603 is also programmed to compare the time at which the portion of the image changes to the time at which the signal source 601 transmits a new image to the projector 600. The processor 603 is also programmed to selectively black out a portion 606b of the projected image 606 corresponding to the portion of the image that has changed.

Figure 3:
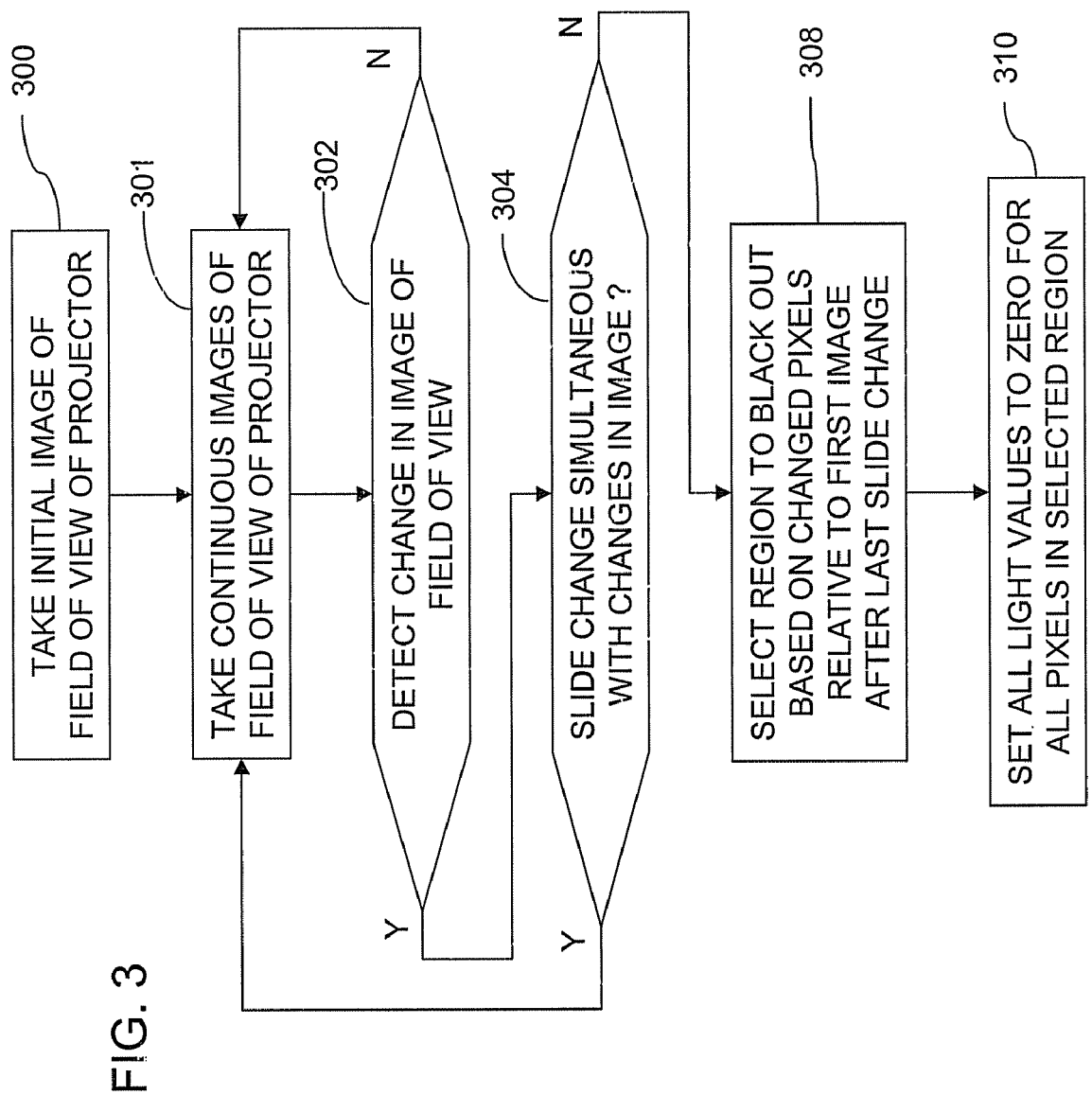
FIG. 3 is a flow chart of an exemplary embodiment.

FIG. 3 is a detailed flow chart of an exemplary method using the apparatus 600.

At step 300, an initial image is taken covering approximately the same field of view FOV as covered by the projector image. That is, the initial image is taken with a camera 605 (e.g., a video camera) or other imager that covers about the same solid angle as the image displayed on the screen 512. The initial image viewed by the camera 605 is the same as the unobstructed image projected by the projector 600 on the screen 612. Preferably, the camera is approximately co-located with the lens of the projector 600, and is preferably close to the projector lens.

At step 301, the camera 605 takes continuous images (second images) of the field of view of the projector 600.

At step 302, the current (second) image is compared to the previous image. Digital image data lends itself to pixel by pixel comparison. In particular, a number of techniques are available for detecting a portion of the video frame that has changed relative to the previous frame. If a portion of the image has changed, then step 304 is executed. If no change is detected, then step 301 is repeated. Because this embodiment detects the presence of the presenter within the field of view of the projector, based on motion or change in the image, this method is suited for use during presentations of still slides.

Alternatively, this method may be used for a presentation of animation or motion video imagery, if the frame sampling frequency by the imager 605 is substantially faster than the frame rate of the projector 600. This would permit imager 605 to detect motion of the presenter in between two consecutive frames of projected animation or video. For this purpose, it is not necessary for the imager 605 to have the same resolution as the image projected by projector 600. The imager 605 is used to detect a person or object, and not to produce a finely detailed image, so the imager can have a relatively low resolution (number of pixels). A high frame sampling rate can be used in combination with a low resolution imager, and still produce an acceptable processing load for the processor 603.

At step 304, having detected a change in the second image, a determination is made whether the change in the image detected by imager 605 was simultaneous with a slide change (from one slide or video frame of the presentation to the next slide or video frame). The change in the image due to change of slides can be detected by receiving an input from the source 501. For example, the slides may be changed based on a trigger signal from the presenter 508 to the signal source 501, which signal can be passed directly to the processor 603. The processor is programmed to compare the time at which a change in the image is detected to the time when the trigger signal was received. Then the processor is able to determine when the change in the detected image is simultaneous with a slide change, and identify non-simultaneous events as corresponding to movement of the presenter. If the change in the captured image was simultaneous with a slide change, then no action is taken in response to the change in the second image, and step 301 is repeated. If the change in the captured image was not simultaneous with a slide change, then it is assumed that a person 608 or object has entered the field of view FOV of the projector 600, and step 308 is executed.

At step 308, a region is selected to be blacked out. For example, all of the changed pixels may be selected to be blacked out. Alternatively, the contour of a portion of the second image that changes may be detected, and all of the points within the contour may be selected to be blacked out. This accommodates the possibility that some isolated pixels within the contour of the person 608 may have substantially unchanged light values. Alternatively, processor 603 may identify a portion of the contour corresponding to the head of the person. For example, the horizontal dimension of the silhouette may be calculated throughout the height of the person 608, and the height at which the horizontal dimension decreases rapidly may be identified as the person's neck. Then all of the points within the contour above the bottom of the neck can be identified as the person's head, and selected to be blacked out.

At step 310, a region is blacked out, containing the selected portion of the contour corresponding to the contour of the entire person, or the head of the person, or all of the pixels that have changed.

Alternatively, the use of microphones can also be avoided by using one or more distance sensors in the system. The distance sensors continuously scan the field of view (FOV) between projector and screen and create a virtual image of the front screen depth (a "depth image" or array of distances between the projector and a number of points on the screen. Any disruptions in the depth image indicates the presence of the presenter. The system then calculates (from the depth image) the area in the projected image that needs to be blackened to avoid light falling on the presenter.

FIG. 4 is a detailed flow chart of an exemplary method using a distance sensor (e.g., a laser) instead of a camera 605. Although a separate apparatus figure is not provided corresponding to the method of FIG. 4, the pertinent elements for the method of FIG. 4 are shown in FIG. 6 (with the substitution of a distance sensor for the camera 605).

At step 400, an initial array of distance measurements is taken covering a grid approximately the same field of view FOV (and about the same solid angle) as covered by the projector image displayed on the screen 512. The initial array of measurements should be the distance between the projector 600 and the various points on the screen 612. The greater the number of measuring points, the greater the accuracy of calculated shape of the presenter will be. Preferably, the distance sensor is approximately co-located with the lens of the projector 600, and is preferably close to the projector lens. For example, the device may be located at the same position where camera 605 is shown in FIG. 6.

At step 401, the device 605 continuously scans a grid of points in the field of view of the projector 600.

At step 402, the current array of distance measurements is compared to the initial array of measurements. Distance data lends itself to point by point comparison. If the distance at one or more points has changed, then step 408 is executed. If no change is detected, then step 401 is repeated. Because this embodiment detects the presence of an object (presumed to be the presenter) within the field of view of the projector based on a change in the distance array, this method is suited for use independent of the content of the presentation, and may be used during presentations of still slides, animation, or motion-picture video.

At step 408, a region is selected to be blacked out. For example, all of the changed points may be selected to be blacked out. Alternatively, the contour of a portion of the distance array that changes may be detected, and all of the points within the contour may be selected to be blacked out. Alternatively, processor 503 may identify a portion of the contour corresponding to the head of the person. For example, the horizontal dimension of the silhouette may be calculated throughout the height of the person 508, and the height at which the horizontal dimension decreases rapidly may be identified as the person's neck. Then all of the points within the contour above the bottom of the neck can be identified as the person's head, and selected to be blacked out.

At step 410, a region is blacked out, containing the selected portion of the contour corresponding to the contour of the entire person, or the head of the person, or all of the points that have changed.

One or more components of an embodiment of the invention may be embodied in the form of computer-implemented processes and apparatus for practicing those processes. The present invention may also be embodied in the form of computer program code embodied in tangible media, such as flash memories, floppy diskettes, read only memories (ROMs), DVDs, CD-ROMs, hard drives, ZIP™ disks, or any other computer-readable storage medium, wherein, when the computer program code is loaded into and executed by a computer, the computer becomes an apparatus for practicing the invention. One or more components of an embodiment of the invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method comprising the steps of:
    detecting a person located between a projector and a surface on which a first image is projected by the projector; and
    automatically blacking out a portion of the first image, so that light from the projector does not fall on the face of the person, wherein:
       the detecting step includes identifying a direction at which the person is located relative to the projector; and
       the direction identifying step includes detecting a sound of the person.

2. The method of claim 1, wherein the detecting step includes:
    identifying a distance between the projector and a nearest object in a field of view that includes at least a portion of the first image; and
    detecting a change in the distance between the projector and the nearest object.

3. The method of claim 2, wherein the distance identifying step includes detecting infrared radiation within a field of view that includes at least a portion of the first image.

4. The method of claim 3, further comprising transmitting a beam of infrared radiation towards the surface on which the first image is projected, wherein the infrared radiation detecting step detects reflected radiation from the beam.

5. The method of claim 2, wherein the blacking out step includes blacking out a portion of the first image occupying a solid angle that depends on the distance between the projector and the nearest object.

6. The method of claim 1, wherein the detecting step includes:
    taking a second image of reflected light within a field of view of the first image; and
    identifying a change in the second image.

7. The method of claim 6, wherein the second image is taken using an imager approximately co-located with the projector.

8. The method of claim 6, wherein the identifying step includes:
    determining whether the change in the second image is simultaneous with a change in the first image projected by the projector; and
    identifying the change in the second image as being due to the person being located between the projector and the surface on which the first image is projected, if the change in the second image is not simultaneous with a change in the first image projected by the projector.

9. The method of claim 8, wherein the identifying step includes taking no action in response to the change in the second image if the change in the second image is simultaneous with a change in the first image projected by the projector.

10. The method of claim 6, further comprising detecting a contour of a portion of the second image that changes, wherein the step of blacking out a portion of the first image includes blacking out all or substantially all of a region containing the portion of the second image that changes.

11. The method of claim 6, further comprising:
    detecting a contour of a portion of the second image that changes, and
    identifying a portion of the contour corresponding to the head of the person, wherein the step of blacking out a portion of the first image includes blacking out a region containing the portion of the contour corresponding to the head of the person.

12. The method of claim 1, wherein the detecting step includes:
    sensing a distance between the projector and a nearest object in a field of view of a sensor approximately co-located with the projector; and
    detecting a change in the sensed distance.

13. The method of claim 12, wherein the sensing is performed using a laser.

14. Apparatus comprising:
    a projector that projects a first image onto a surface;
    a detector for detecting a person located between the projector and the surface;
    said projector including a processor that automatically causes the projector to black out a portion of the first image, so that light from the projector does not fall on the face of the person; and
    at least two microphones for providing signals to the processor for determining a direction to the person relative to the projector.

15. The apparatus of claim 14, further comprising:
    a sensor for detecting radiation for identifying a distance between the projector and a nearest object in a field of view that includes at least a portion of the first image.

16. The apparatus of claim 15, wherein the processor includes means for detecting a change in the distance between the projector and the nearest object based on signals from the sensor.

17. The apparatus of claim 15, further comprising a laser or an infrared radiation transmitter for emitting radiation towards the surface, wherein the sensor is capable of detecting radiation originating from the laser or the infrared radiation transmitter and reflected by at least one of the group consisting of the surface and the person.

18. The apparatus of claim 14, further comprising a camera approximately co-located with the projector for taking a second image of light reflected from at least one of the group consisting of the surface and the person.

19. The apparatus of claim 18, wherein the processor includes:
    means for determining whether a change in the second image is simultaneous with a change in the first image projected by the projector; and
    means for identifying the change in the second image as being due to the person being located between the projector and the surface on which the first image is projected, if the change in the second image is not simultaneous with a change in the first image projected by the projector.

20. A computer readable storage medium encoded with computer program code, such that when the computer program code is executed by a processor of a projector apparatus, the apparatus performs a method comprising the steps of:

detecting a person located between a projector and a surface on which a first image is projected by the projector; and automatically blacking out a portion of the first image, so that light from the projector does not fall on the face of the person, wherein:

the detecting step includes identifying a direction at which the person is located relative to the projector; and the direction identifying step includes detecting a sound of the person.

* * * * *